United States Patent [19]

Boubille

[11] Patent Number: 4,899,840
[45] Date of Patent: Feb. 13, 1990

[54] APPARATUS FOR WEIGHING A PALLET WITH A LOAD THEREON FOR USE WITH A VEHICLE HAVING TINES OR THE LIKE

[76] Inventor: Jacques C. Boubille, 12316 Julie La., Saratoga, Calif. 95070

[21] Appl. No.: 369,867

[22] Filed: Jun. 22, 1989

[51] Int. Cl.$^4$ ...................... G01G 19/08; G01G 23/06
[52] U.S. Cl. .................................. 177/139; 177/140; 177/187
[58] Field of Search ................ 177/139, 140, 187, 211

[56] References Cited

U.S. PATENT DOCUMENTS

| | | | |
|---|---|---|---|
| 3,063,576 | 11/1962 | Hofmeister | 177/139 X |
| 4,453,607 | 6/1984 | Zink | 177/211 X |
| 4,611,677 | 9/1986 | Yu | 177/211 X |
| 4,666,004 | 5/1987 | Raz | 177/140 X |

Primary Examiner—George H. Miller, Jr.
Attorney, Agent, or Firm—Jack M. Wiseman

[57] ABSTRACT

A weighing apparatus for a vehicle having tines in which a ramp is mounted on each tine in front of and in spaced relation to a weighing load bearing plate. The ramp and the confronting weighing load bearing plate are not mechanically joined. Below each weighing load bearing plate are load cells for emitting changes in signals representative of the weight of a load on the weighing load bearing plates. As the load advances toward the weighing load bearing plates, the ramps attenuate excessive forces and shock resulting from the load advancing onto the weighing load bearing plates. As a consequence thereof, the load cells are not subject to the excessive shocks or forces of an advancing load.

23 Claims, 3 Drawing Sheets

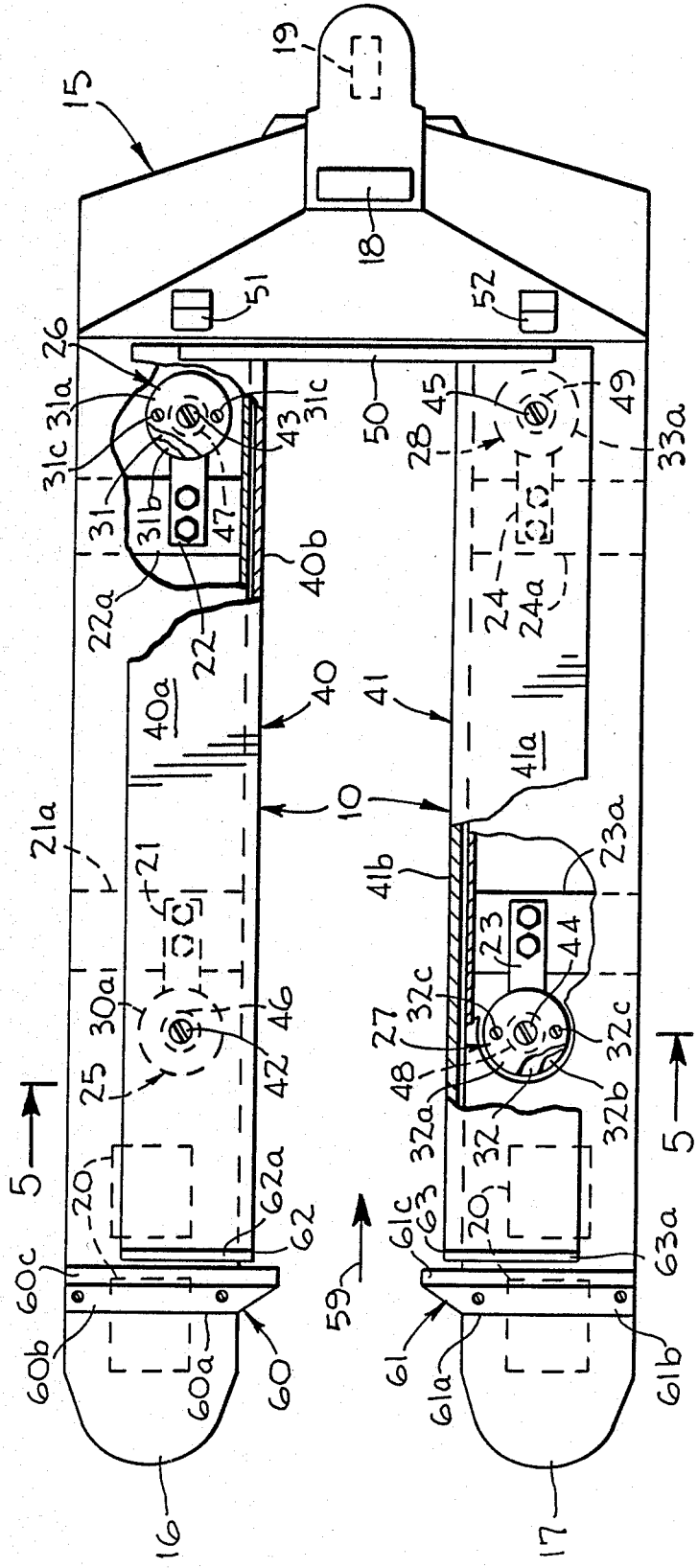
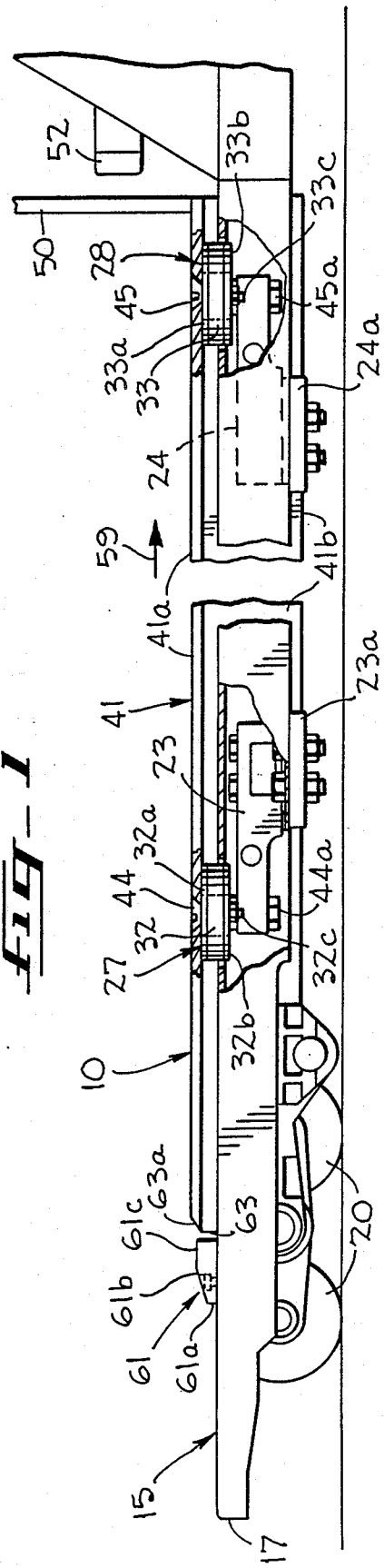
fig-1
fig-2

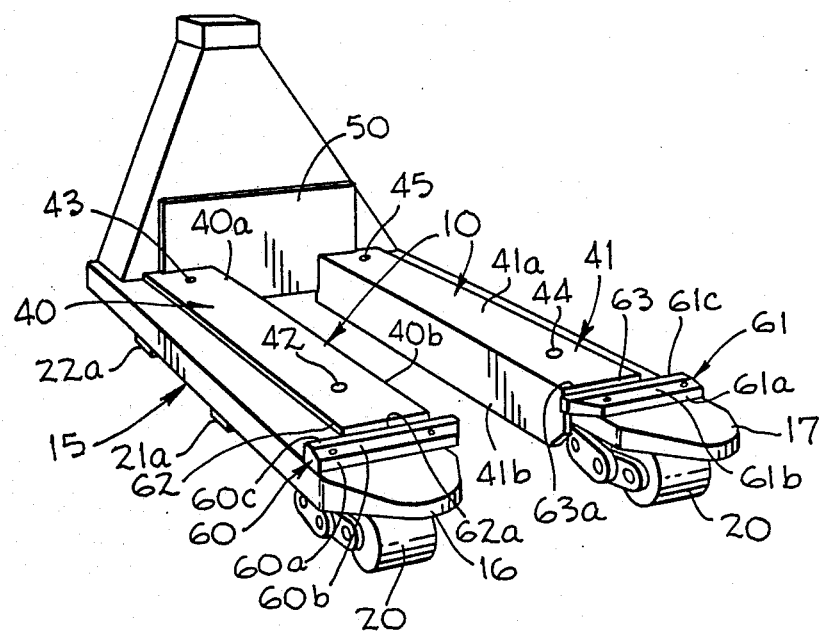
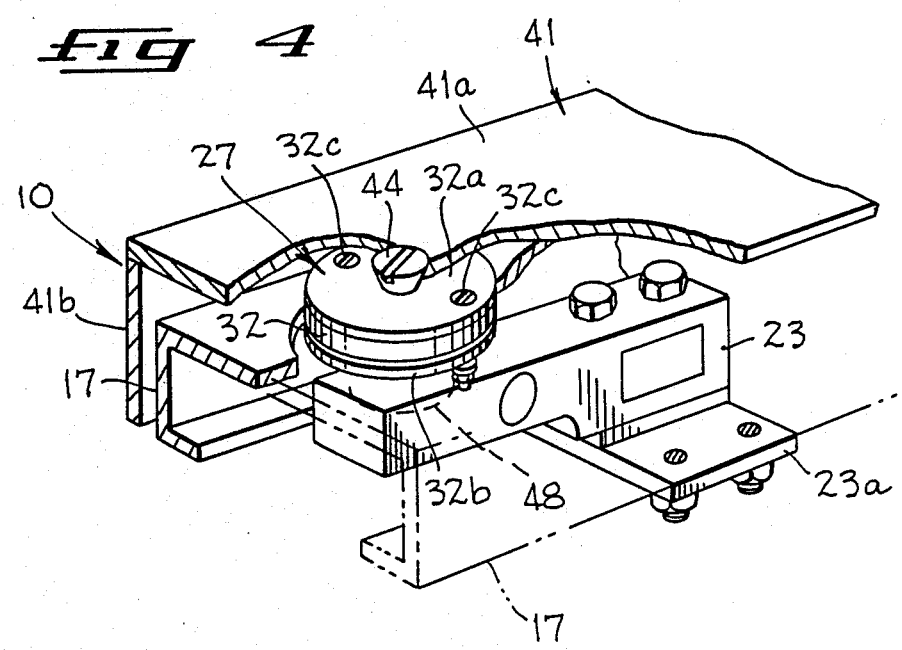

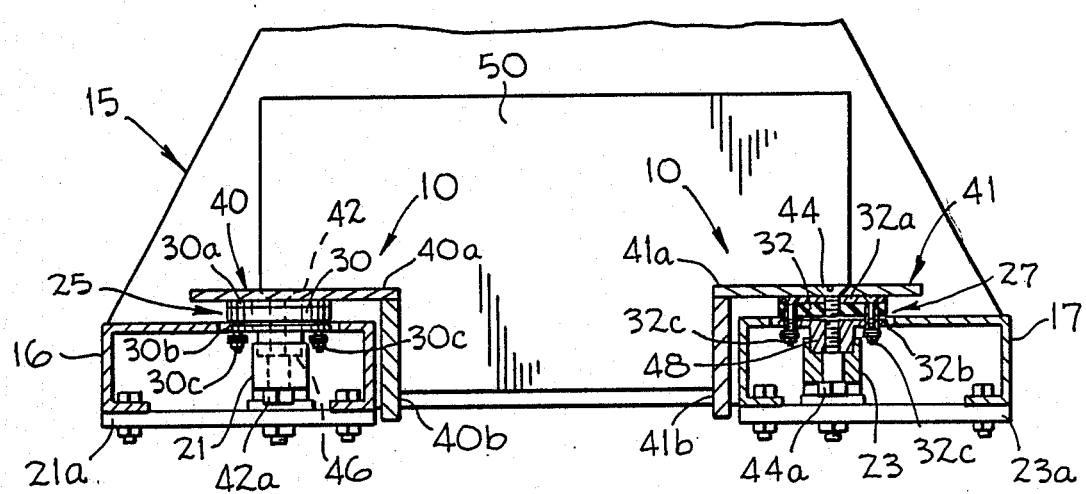
*fig_5*
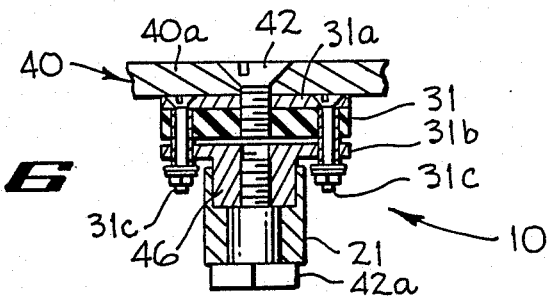
*fig_6*
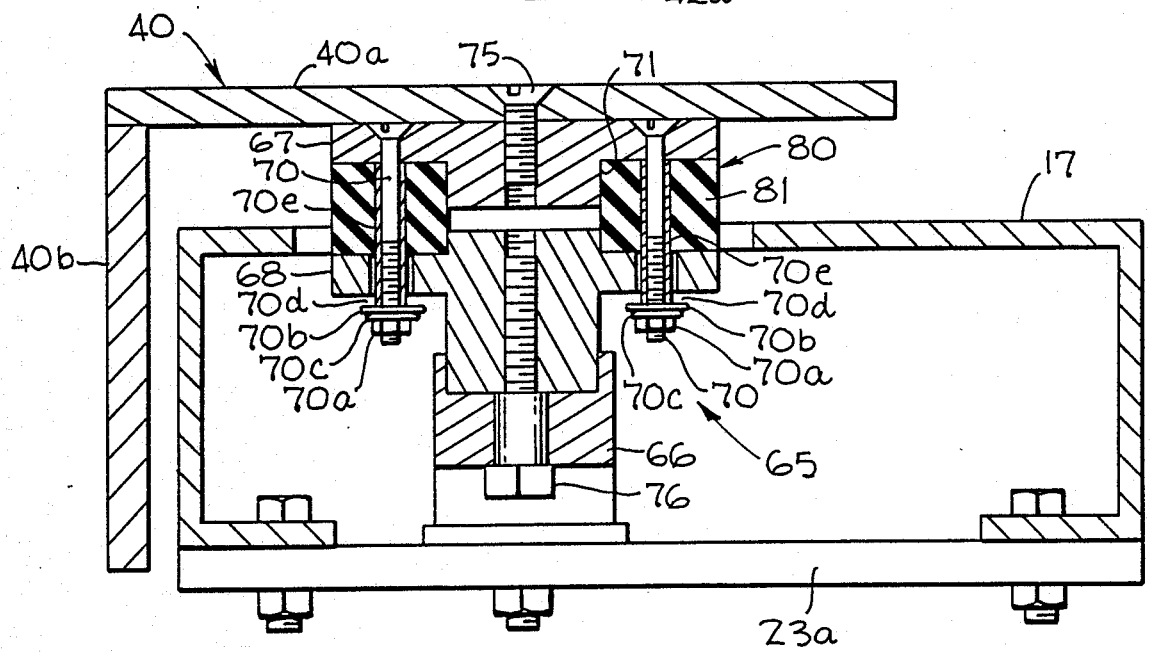
*fig_7*

APPARATUS FOR WEIGHING A PALLET WITH A LOAD THEREON FOR USE WITH A VEHICLE HAVING TINES OR THE LIKE

BACKGROUND OF THE INVENTION

The present invention relates in general to weighing apparatus, and more particularly to a weighing apparatus suitable for use with a vehicle having tines.

Pallet jacks or pallet trucks have heretofore been employed for weighing a pallet with a load thereon during the carrying of the pallet. Such apparatus have employed strain gauge load cells, which produce electrical signals representative of the weight of the pallet and the load thereon. The signals are applied to a digital display to give a read-out of the weight of the pallet and the load carried by the pallet. One of such apparatus has been advertised in a brochure entitled Mobile Universal - Waage HY-UW 2000.

Strain gauge load cells are prone to being damaged when subjected to intense forces and/or shock exceeding their rated capacity. The replacement of load cells has been generally costly. When a pallet jack, or other such vehicle that comprises tines for carrying a load, is equipped with a weighing apparatus that includes one or several strain gauge load cells, intense forces and/or shocks can easily occur at the time that the tines are inserted under the load to be moved.

In the case of a pallet jack, when a pallet with a load thereon is to be moved, the tines are generally inserted in the center of the pallet, below the deck boards. In doing so, the center post of the pallet may be hit by one of the tines. This shock can be mechanically transmitted to the load cells. Further, when the front wheels of the tines roll over the bottom outer board of the pallet, the resulting shock can also be mechanically transmitted to the load cells.

In addition, when the tines are not placed at their lowest possible position, they can become wedged between the top and bottom outer boards of the pallet. The operator of the pallet jack may then try to force the tines under the pallet. This action can result in intense forces being mechanically transmitted to the load cells.

When the pallet reaches the end of its movement over the tines and comes to rest against a mechanical stop, which is necessary to prevent the pallet from coming into contact with the non-weighing part of the pallet jack, an additional shock and/or intense force can be mechanically transmitted to the load cells.

The U.S. Pat. to Raz, No. 4,666,004, issued on May 19, 1987, for Pallet Truck With Weighing Scale, discloses a pallet truck with load cells mounted on the tines for weighing loads carried by the pallet truck. Floating members are disposed over the tines and extend along the entire length of the tines to provide the weighing surfaces. A crosspiece provides rigidity for the floating members.

The U.S. Pat. to Cellitti et al., No. 2,935,213, issued on May 3, 1960, for Fork Lift Vehicle Weighing Scale, discloses a forklift vehicle having weighing scale forklift tines. Each of the tines includes a longitudinal bar that is mounted on the associated tine and is slightly elevated with respect to the end portions of the associated tine. Load cells respond to the vertical weighing movement of the longitudinal bars. Each of the tines is provided with a front bearing plate that is secured to the associated tine forward of the associated longitudinal bar.

In the U.S. Pat. to Pien, No. 3,059,710, issued on Oct. 23, 1962, for Indirect Measurement of Vertical Forces, there is disclosed a load supporting member for a forklift truck with weighing apparatus. The load supporting member is a cantilevered member which applies forces to the strain gauge load cell commensurate with the weight of the load. One end of the load supporting member is the free end that moves vertically in response to the weight of the load. The other end of the load supporting member is fixed to the nose of the tine. There is a rigid connection between the proximal end of the load supporting member and the nose of the tine. A pallet moving onto the tine first engages the nose of the tine and then advances onto the load supporting member.

In the U.S. Pat. No. to Russo, No. 4,420,053, issued on Dec. 13, 1983, for Fork Lift Weighing Apparatus, there is disclosed a fork for lifting a load. A weighing bridge and load cells are disposed within a recess of the fork. Disc shock absorbers of hard rubber are disposed between the weighing bridge and the load cells.

The U.S. Pat. No. to Wise, No. 2,643,781, issued on June 30, 1953, for Load Weighing System For Lift Trucks And The Like, discloses a forklift with an hydraulic scale installed on the forklift to enable a load to be weighed at the same time it is lifted by the fork. The U.S. Pat. No. to Hofmeister, No. 3,063,576, issued on Nov. 13, 1962, for Weighing Means For Fork-Lift Trucks, discloses a forklift truck with forks for lifting a load. Each fork has a bar extending thereover that is supported at each end by a load cell.

In the U.S. Pat. No. to Airesman, No. 3,910,363, issued on Oct. 7, 1975, for Weighing Device For Fork Lift Truck, there is disclosed a forklift truck with forks to lift a load. A movable plate for the forklift truck is moved vertically downward when the load is lifted by the fork. Load cells are coupled to the movable plate for providing electrical signals proportionate to the load in response to the vertical movement of the movable plate. Overload stops are provided to limit the downward vertical movement of the movable plate to reduce damage to the load cells.

In the U.S. Pat. No. to Curran, No. 4,589,507, issued on May 20, 1986, for On Board Scale Devices, there is disclosed an on board scale used in conjunction with a truck, trailer or the like to obtain the weight of various freight items placed thereon. The scale includes retractable pneumatic scale assemblies for weighing the freight. The U.S. Pat. No. to Baldwin et al., No. 4,638,876, issued on Jan. 27, 1987, for Weighing Apparatus, discloses a weighing apparatus for use with a forklift. The weighing apparatus includes a weighing plate on which the load is placed. Three load cells engage the weighing plate. Lines connecting the load cells define a triangle.

SUMMARY OF THE INVENTION

A weighing apparatus for a vehicle that comprises tines for carrying a load. Over each tine is an impact ramp and a weighing load bearing plate, which are spaced apart in the direction of movement of the load and are mechanically disjoined. Each impact ramp is disposed in front of its associated weighing load bearing plates, as viewed in the direction of travel of the load over the tines. Load cells respectively respond to the weighing action of the associated weighing load bearing plates. As the load advances toward the weighing load bearing plates, the impact ramps attenuate and absorb excessive forces resulting from the movement of the load over the front part of the tines before the load advances onto the weighing load bearing plates. As a consequence thereof, the load cells are not subject to excessive shocks and/or forces.

An object of the present invention is to provide a weighing apparatus for a vehicle with tines or the like employing load cells for emitting electrical signals representative of the weight of a load in which the load cells are not subjected to excessive shocks and/or forces.

Another object of the present invention is to provide a weighing apparatus for a vehicle with tines or the like employing load cells for emitting electrical signals representative of the weight of a load in which there is pre-attenuation or pre-absorption of excessive shocks and/or forces prior to the load cells responding to the weight of the load.

A feature of the present invention is that a weighing load bearing plate of a weighing apparatus to which a load cell responds during the weighing of a load is not subject to excessive shocks and/or forces that may be damaging to the load cell by pre-attenuation and pre-absorption of excessive shocks and/or forces.

Another feature of the present invention is that an impact ramp is spaced from and is mechanically disjoined from a weighing load bearing plate for attenuating and absorbing excessive shocks and/or forces before a load advances onto the weighing load bearing plate to reduce damaging impact or shock being applied to load cells responding to the weighing action of the weighing load bearing plate.

Another feature of the present invention is the employment of a back stop plate with shock absorbing devices spaced therebehind to inhibit the application of excessive shocks and/or forces to the load cells by mechanical transmission.

Another feature of the present invention is the employment of a shock absorbing device mounted on a vehicle and disposed behind and spaced from a back stop plate to protect a load cell against excessive shocks and/or forces.

DESCRIPTION OF THE DRAWINGS

FIG. 1 is a diagrammatic plan view of the weighing apparatus embodying the present invention mounted on a pallet truck with weighing load bearing plates broken away to illustrate load cells mounted therebelow.

FIG. 2 is a fragmentary, diagrammatic, side elevation view of the weighing apparatus and pallet truck shown in FIG. 1 with a portion of a tine broken away to illustrate a load cell and the mounting therefor.

FIG. 3 is a reduced, fragmentary diagrammatic perspective view of the weighing apparatus and pallet truck shown in FIGS. 1 and 2.

FIG. 4 is an enlarged, fragmentary, perspective view of a tine, load cell and weighing load bearing plate employed in the weighing apparatus shown in FIGS. 1-3.

FIG. 5 is an enlarged, fragmentary, vertical sectional view taken along line 5—5 of FIG. 1 and particularly illustrating load cells and the mounting therefor.

FIG. 6 is an enlarged, diagrammatic, vertical sectional view partially in elevation of the load cell and impact absorber along with the weighing load bearing plate employed in the weighing apparatus shown in FIGS. 1-5.

FIG. 7 is a diagrammatic vertical sectional view partially in elevation of a load cell and mounting therefor, which is a modification of the load cell and mounting therefor shown in FIGS. 1, 2 and 4-6, and adaptable for use in the weighing apparatus shown in FIGS. 1-3.

DESCRIPTION OF THE PREFERRED EMBODIMENTS

Illustrated in FIGS. 1-5 is a weighing apparatus 10 embodying the present invention shown mounted, in the exemplary embodiment, on a suitable pallet truck or pallet jack 15. While the weighing apparatus 10 is illustrated mounted on a suitable pallet truck or pallet jack 15, in the exemplary embodiment, it is apparent that the weighing apparatus 10 could be mounted on a suitable forklift, pallet lift, truck lift or any suitable vehicle having tines or forks for carrying a load and, in the preferred embodiment, carrying a load supported by or carried by a pallet. In the exemplary embodiment, the pallet truck 15 includes tines 16 and 17 for moving a load carried by a pallet. Each of tines 16 and 17, in the exemplary embodiment, is formed with a horizontal member and depending side members which terminate in horizontal flanges (FIG. 5). The pallet truck 15 includes a conventional hydraulic system, not shown, for lifting the tines 16 and 17. The lifting of the tines 16 and 17 raises and transports a load on a pallet. Wheels 20 support the tines 16 and 17 on the ground and associated linkage causes the lifting and lowering of the tines 16 and 17 in response to the operation of the hydraulic system. In a conventional manner, the tines 16 and 17 are inserted into parallel grooves formed under the pallet upon which is placed a load to be lifted and transported to a remote site.

The weighing apparatus 10 comprises a plurality of load cells 21-24, which are mounted on mounting plates 21a-24a, respectively, by mechanical means, such as nuts and bolts (FIGS. 1, 2, 4 and 5). The mounting plates 21a and 22a, in turn, are bolted to the underside of the flanges for the tine 16 (FIG. 5). Similarly, the mounting plates 23a and 24a are bolted to the underside of the flanges for the tine 17.

In the preferred embodiment, two load cells 21 and 22 are mounted on the tine 16 by means of the mounting plates 21a and 22a, respectively. Similarly, two load cells 23 and 24 are mounted on the tine 17 by means of the mounting plates 23a and 24a, respectively. The load cells 21-24, in the exemplary embodiment, receive an electrical excitation, in a well-known manner, from a suitable weight indicator 18 (FIG. 1) that is mounted on the pallet truck 15. The signal outputs from the load cells 21-24 in response to a load being weighed are applied to the weight indicator 18 in a well-known manner. In turn, the weight indicator 18 displays the weight of the load in a conventional and well-known manner. In the preferred embodiment, the load cells 21-24 are of the strain gauge type. The weight indicator 18 is located in the vicinity of a steerable wheel 19 for the pallet truck 15.

Disposed above the load cells 21-24, respectively, and within suitable openings formed in the tines 16 and 17 are shock absorbers 25-28 (FIGS. 1, 2 and 4-6). The shock absorbers 25-28 comprise shock absorbing pads 30-33, respectively, which are sandwiched between upper plates 30a-33a, respectively, and lower plates 30b-33b, respectively (FIGS. 2, 4, 5 and 6). In the exemplary embodiment, each pad of the shock absorbers 25-28 is made of a hard rubber disc. In the preferred embodiment, the shock absorbers 25-28, respectively, are secured together as unitary structures by means of nuts and bolts 30c-33c, respectively. The shock absorbers 25 and 26 extend above the horizontal member of the tine 16 and the shock absorbers 27 and 28 extend above the horizontal member of the tine 17. The shock absorbers 25-28 provide a medium through which to apply the load forces to the load cells 21-24, respectively, for emitting electrical signals to the weight indicator representative of the load being weighed, in a conventional and well-known manner. Additionally, the shock absorbers 25-28 absorb shock transmitted to the load cells 21-24 for prolonging their useful life.

Disposed above the shock absorbers 25 and 26 and seated thereon is a horizontal plate 40a of a weighing platform or weighing load bearing plate 40 (FIGS. 2-5). Disposed above the shock absorbers 27 and 28 and seated thereon is a horizontal plate 41a of a weighing platform or weighing load bearing plate 41. A vertical plate 40b of the weighing load bearing plate 40 depends from the associated plate 40a along the inboard side of the tine 16 (FIG. 5). A vertical plate 41b of the weighing load bearing plate 41 depends from the horizontal plate 41a associated therewith along the inboard side of the tine 17. In the exemplary embodiment, the associated horizontal and vertical plates of the respective weighing load bearing plate are welded together. The weighing load bearing plates 40 and 41 are made of suitable material, such as mild steel.

The horizontal plate 40a is countersunk above the shock absorbers 25 and 26. Screws 42 and 43 are formed with bevelled heads and extend through the associated countersunk bores of the weighing load bearing plate 40. By threaded engagement with internally threaded hubs 46 and 47 of the upper plates 30b and 31b of the shock absorbers 25 and 26, the screws 42 and 43 secure the weighing load bearing plate 40 to the shock absorbers 25 and 26 (FIGS. 5 and 6).

Screws 42a and 43a are oppositely directed and axially aligned with the screws 42 and 43, respectively. The screw 42a is secured by a bore formed in the load cell 21 and is disposed in threaded engagement with the hub 46 of the shock absorber 25. Similarly, the screw 43a is secured by a bore formed in the load cell 22 and is disposed in threaded engagement with the hub 47 of the shock absorber 26. Through this arrangement, the screws 42a and 43a secure, respectively, the load cells 21 and 22 to the shock absorber 25 and 26. Thus, the weighing load bearing plate 40 is secured to the shock absorbers 25 and 26, and the shock absorbers 25 and 26 are secured to the load cells 21 and 22.

The horizontal plate 41a is countersunk above the shock absorbers 27 and 28. Screws 44 and 45 are formed with bevelled heads and extend through the associated countersunk bores of the weighing load bearing plate 41. By threaded engagement with internally threaded hubs 48 and 49 of the upper plates 32b and 33b of the shock absorbers 27 and 28, the screws 44 and 45 secure the weighing load bearing plate 41 to the shock absorbers 27 and 28 (FIGS. 2, 4 and 5).

Screws 44a and 45a are oppositely directed and axially aligned with the screws 44 and 45, respectively. The screw 44a is secured by a bore formed in the load cell 23 and is disposed in threaded engagement with the hub 48 of the shock absorber 27. Similarly, the screw 45a is secured by a bore formed in the load cell 24 and is disposed in threaded engagement with the hub 49 of the shock absorber 28. Through this arrangement, the screws 44a and 45a secure the load cells 23 and 24 to the shock absorbers 27 and 28. Thus, the weighing load bearing plate 41 is secured to the shock absorbers 27 and 28 and the shock absorbers 27 and 28 are secured to the load bearing cells 23 and 24 (FIGS. 2, 4 and 5).

The weighing load bearing plates 40 and 41 are supported for vertical movement through the associated shock absorbers 25-28 and the associated load cells 21-24. The lower ends of the load cells 21-24 are fixedly secured to the associated tines 16 and 17 through the associated mounting plates 21a-24a in a manner heretofore described.

Thus, a load on the horizontal plates of the weighing load bearing plates 40 and 41 causes the weighing load bearing plates 40 and 41 to be depressed. The load cells 21-24 react to the depression of the weighing load bearing plates 40 and 41 to cause the load cells 21-24 to emit changes in electrical signals to the weight indicator, which signals are representative of the load being weighed, in a well-known and conventional manner.

Disposed transversely across the weighing apparatus 10 and secured, such as by welding, to the rear walls of the weighing load bearing plates 40 and 41 is a back stop 50 (FIGS. 1-3 and 5). In the preferred embodiment, the back stop 50 is a rigid member made of mild steel. When an operator of the pallet truck 15 advances a load for weighing, the load is urged rearwardly until the load contacts the back stop 50. For improved accuracy in weighing, the back stop 50 is only connected mechanically to the weighing load bearing plates 40 and 41, and is not joined mechanically to the pallet truck 15 (FIG. 2). Additionally, the back stop plate 50 bridges the weighing load bearing plates 40 and 41 to add rigidity to the weighing apparatus 10.

To further protect the load cells 21-24 against excessive forces and shock, absorbing devices or cushioned bumpers 51 and 52 are mounted on the pallet truck 15 in spaced relation to the back stop 50 and behind the back stop 50 when viewed in the direction of travel of the pallet with the load thereon advancing over the weighing load bearing plates 40 and 41 (FIGS. 1 and 2). The shock absorbing devices 51 and 52 are made of hard rubber facing the back stop 50 and are mounted in a metallic housing that is secured to the pallet truck 15.

The shock absorbing devices 51 and 52 are spaced from the back stop 50 so that no mechanical interference occurs therebetween under normal operating conditions and, yet, an excessive force applied to the weighing load bearing plates 40 and 41 and the back stop 50 will be dampened or absorbed by the shock absorbing devices 51 and 52 to reduce the application of excessive shocks and/or forces upon the load cells 21-24.

Disposed in front of the weighing load bearing plates 40 and 41, when viewed in the direction of travel of a load on the tines 16 and 17 as shown by an arrow 59 (FIGS. 1 and 2), are impact ramps 60 and 61, respectively (FIGS. 1-3). The impact ramps 60 and 61 are secured to the upper surfaces of the tines 16 and 17, respectively, by suitable means, such as nuts and bolts. In the exemplary embodiment, the ramps 60 and 61 are solid blocks made of suitable material, such as mild steel.

The forward sections of the ramps 60 and 61 are slightly elevated at 60a and 61a, respectively, above the upper surfaces of the tines 16 and 17, respectively. The pallet having a load thereon is lifted as it advances along inclined sections 60b and 61b of the ramps 60 and 61, respectively, in its travel toward the weighing load bearing plates 40 and 41. Thereupon, the advancing pallet travels over flat, horizontal sections 60c and 61c of the ramps 60 and 61 in its travel toward and onto the weighing load bearing plates 40 and 41.

Vertical forward sections 62 and 63 of the weighing load bearing plates 40 and 41, respectively, are slightly higher than the horizontal sections 60c and 61c of the ramps 60 and 61, respectively. The inclined forward sections 62a and 63a of the weighing load bearing plates 40 and 41, respectively, are higher than the horizontal sections 60c and 61c of the ramps 60 and 61, respectively, to facilitate the movement of the pallet with the load thereon onto the flat horizontal members 40a and 41a of the weighing load bearing plates 40 and 41, respectively. The pallet with the load thereon continues to advance on the weighing load bearing plates 40 and 41 until the pallet contacts the back stop 50. The rear ends of the impact ramps 60 and 61 are spaced from the front end of the weighing load bearing members 40 and 41, respectively, when viewed in the direction of travel of a pallet with a load thereon advancing over the tines 16 and 17 as shown by the arrow 59. The ramps 60 and 61 are not mechanically joined to the weighing load bearing plates 40 and 41, respectively.

The ramps 60 and 61 serve to reduce damage to the load cells 21-24 and erroneous weight readings by attenuating the transmission of excessive shocks and/or forces destined for application to the leading edges of the weighing load bearing plates 40 and 41. The weighing load bearing plates 40 and 41 are constructed to minimize the magnitude of deflection under load to reduce incorrect weight readings. The L-shaped weight bearing plates 40 and 41 have their horizontal sections 40a and 41a welded to the rigid back stop 50 and their associated horizontal their associated horizontal and vertical members welded together to improve the application of the weighing moment through the weighing bearing plates 40 and 41 against the load cells 21-24 for a more accurate reading of the weight.

A pallet with a load thereon advances over the weighing load bearing plates 40 and 41 until the pallet with the load thereon engages the back stop 50. The pallet and the load thereon causes the weighing load bearing plates 40 and 41 to be depressed. The load cells 21-24 react to the downward movement of the associated weighing load bearing plates 40 and 41 for emitting changes in electrical signals representative of the weight of the pallet and the load thereon.

Illustrated in FIG. 7 is a load cell assembly 65 which is disposed below the weighing load bearing plate 40. Generally a plurality of load cell assemblies 65 will be disposed below the weighing load bearing plate 40. A similar arrangement of load cell assemblies 65 is provided for the weighing load bearing plate 41. Each load bearing assembly 65 includes a suitable load cell 66 and the load cells 66 respond to the depression of the associated weighing load bearing plates 40 and 41, when a pallet with a load thereon advances onto the weighing load bearing plates 40 and 41, to emit changes in signal representative of the weight of the pallet and the load thereon.

Each load cell assembly 65 includes a shock absorber 80. Each shock absorber 80 includes a top plate 67 that is in contact with the horizontal section 40a of the weighing load bearing plate 40. Also included in the shock absorber 80 is a bottom plate 68 that has contact with the upper surface of the load cell 66. Disposed between the top plate 67 and the bottom plate 68 is an annular shock absorbing pad 81 made of suitable material such as hard rubber. Suitable bolts 70 secure together as a unitary structure the top plate 67, the bottom plate 68 and the shock absorbing pad 81. A cylindrical tube 70e surrounds each bolt 70. For securing the weighing load bearing plate 40 to the shock absorber 80, a screw 75 is received by a countersink in the horizontal section 40a of the weighing load bearing plate 40 and is disposed in threaded engagement with the upper plate 67 of the shock absorber 80. The screw 75 has the tapered head thereof seated in the countersink opening formed in the horizontal section 40a of the weighing load bearing plate 40 so that the head of the bolt is at even height with the upper surfaces of the horizontal section 40a.

An oppositely directed screw 76 is received by a bore in the load cell 66 for threaded engagement with the internally threaded hub of the lower plate 68 of the shock absorber 80. The lower section of the load cell 66 is secured to the tine 17 through the mounting plate 23a in a manner previously described. Thus, the weighing load bearing plate 40 is secured to the upper plate of the shock absorber 80. The opposite lower plate of the shock absorber 80 is secured to the load cell 66. The load cell 66 is secured to the tine 17 through the mounting plate 23a.

Confronting recessed areas of the top plate 67 and the bottom plate 68 along the perimeter thereof define an annular opening 71 in which is disposed the annular shock absorbing pad 81. The shock absorber 80 serves to protect the load cell 66 against excessive shocks and/or forces. Additionally, the shock absorber 80 provides the medium through which the load forces are transmitted to the load cell 66. The shock absorber 80 also serves as a multi-direction movable connection that transmits all forces, even side forces originating from the pallet, with the load thereon advancing on the weighing load bearing plates in a concentrated, even downward fashion. Toward this end, a nut 70a is in threaded engagement with the free end of each bolt 70. Between the lower plate 68 and each nut 70a is a washer 70b and a locking member 70c. A small gap 70d is present between each washer 70b and the lower plate 68.

A pallet with a load thereon advances over the weighing load bearing plates 40 and 41 until the pallet with the load thereon engages the back stop 50. The pallet and the load thereon causes the weighing load bearing plates 40 and 41 to be depressed or to deflect. The load cells 66 react to the downward movement of the associated weighing load bearing plates 40 and 41 for emitting changes in electrical signals representative of the weight of the pallet and the load thereon.

What is claimed is:

1. A weighing apparatus for a vehicle having tines or the like comprising:
   (a) a weighing platform movable in response to a load thereon, said weighing platform having a front end and a rear end as viewed from the direction of travel of the load;
   (b) at least one load cell supported below said weighing platform and responsive to the movement of said weighing platform for emitting an electrical signal representative of the weight of the load on said weighing platform; and
   (c) a ramp mounted on said tine in front of and spaced from the front end of said weighing platform for attenuating excessive forces resulting from a load advancing toward said weighing platform, said ramp being mechanically disjoined from said weighing platform for attenuating excessive forces resulting from an advancing load to reduce the transmission of excessive forces to said weighing platform.

2. A weighing apparatus as claimed in claim 1 and comprising a back stop secured to the rear end of said weighing platform for limiting the movement of the load relative to said weighing platform and for rigidifying said weighing platform.

3. A weighing apparatus as claimed in claim 2 and comprising at least one impact absorbing device spaced from said back stop in the direction of travel of the load for absorbing excessive impact on said back stop resulting from excessive forces being applied to said back stop.

4. A weighing apparatus as claimed in claim 3 and comprising a shock absorber disposed below said weighing platform and above said load cell for protecting said load cell from excessive forces.

5. A weighing apparatus as claimed in claim 4 wherein said shock absorber comprises a layer of shock absorbing material mechanically secured between metallic plates.

6. A weighing apparatus as claimed in claim 5 wherein said tine has an upper surface and said ramp includes a front end and a rear end as viewed from the direction of travel of the load, said ramp comprising:
(a) a generally upright wall at the front end thereof extending upwardly from the upper surface of said tine;
(b) an inclined surface extending from said generally upright wall toward said rear end for lifting a load advancing thereon; and
(c) a generally horizontal surface extending from said inclined surface toward said rear end.

7. A weighing apparatus as claimed in claim 6 wherein said weighing platform comprising:
(a) a generally upright wall at the front end thereof extending upwardly from a plane passing through an upper surface of said tine;
(b) an inclined surface extending from said generally upright wall toward said rear end of said weighing platform, said inclined surface of said weighing platform being greater in height than said generally horizontal surface of said ramp; and
(c) a generally horizontal surface extending from said inclined surface of said weighing platform toward said rear end of said weighing platform, said generally horizontal surface of said weighing platform being higher than said generally horizontal surface of said ramp, said load is disposed on said generally horizontal surface of said weighing platform during the weighing thereof.

8. A weighing apparatus as claimed in claim 1 and comprising a shock absorber disposed below said weighing platform and above said load cell for protecting said load cell from excessive forces and for providing a medium through which forces are transmitted to said load cell from said weighing platform.

9. A weighing apparatus as claimed in claim 8 wherein said shock absorber comprises a layer of shock absorbing material mechanically secured between metallic plates.

10. A weighing apparatus as claimed in claim 1 wherein said tine has an upper surface and said ramp includes a front end and a rear end as viewed in the direction of travel of the load, said ramp comprising:
(a) a generally upright wall at the front end thereof extending upwardly from the upper surface of said tine;
(b) an inclined surface extending from said generally upright wall toward said rear end for lifting a load advancing thereon; and
(c) a generally horizontal surface extending from said inclined surface toward said rear end.

11. A weighing apparatus as claimed in claim 10 wherein said weighing platform comprising:
(a) a generally upright wall at the front end thereof extending upwardly from a plane passing through an upper surface of said tine;
(b) an inclined surface extending from said generally upright wall toward said rear end of said weighing platform, said inclined surface of said weighing platform being greater in height than said generally horizontal surface of said ramp; and
(c) a generally horizontal surface extending from said inclined surface of said weighing platform toward said rear end of said weighing platform, said generally horizontal surface of said weighing platform being higher than said generally horizontal surface of said ramp, said load is disposed on said generally horizontal surface of said weighing platform during the weighing thereof.

12. A weighing apparatus for a pallet truck or the like having tines or the like for weighing a pallet with a load thereon, said weighing apparatus comprising:
(a) a plurality of weighing load bearing plates in spaced relation movable in response to a pallet with a load thereon, each of said weighing load bearing plates having a front end and a rear end as viewed in the direction of travel of the pallet with the load thereon;
(b) a plurality of load cells disposed below said weighing load bearing plates, respectively, and responsive to the movement of said weighing load bearing plates, respectively, for emitting changes in electrical signals representative of the weight of the pallet with the load thereon; and
(c) a plurality of ramps mounted on said tines, respectively, in front of and spaced from said weighing load bearing plates, respectively, for attenuating excessive forces of the pallet with the load thereon advancing toward said weighing load bearing plates, each of said ramps being mechanically disjoined from its associated weighing load bearing plate for attenuating excessive forces resulting from an advancing load without the transmission of excessive forces from said ramps to said weighing load bearing plates, respectively.

13. A weighing apparatus as claimed in claim 12 and comprising a back stop secured to the rear ends of said weighing load bearing plates for limiting the movement of the pallet with the load thereon relative to said weighing load bearing plates and for rigidifying said weighing load bearing plates.

14. A weighing apparatus as claimed in claim 13 and comprising at least one impact absorbing device spaced from said back stop in the direction of travel of said pallet for absorbing excessive impact on said back stop resulting from excessive forces being applied to said back stop.

15. A weighing apparatus as claimed in claim 14 and comprising a shock absorber for each of said load cells disposed below its associated weighing load bearing plate and above its associated load cell for protecting said load cells from excessive forces.

16. A weighing apparatus as claimed in claim 15 wherein each of said shock absorbers comprises a layer of shock absorbing material mechanically secured between metallic plates.

17. A weighing apparatus as claimed in claim 12 and comprising a shock absorber for each of said load cells disposed below its associated weighing load bearing plate and above its associated load cell for protecting said load cells from excessive forces.

18. A weighing apparatus as claimed in claim 15 wherein each of said shock absorbers comprises a layer of shock absorbing material mechanically secured between metallic plates.

19. A weighing apparatus as claimed in claim 12 wherein each of said tines has an upper surface and each of said ramps includes a front end and a rear end as viewed from the direction of travel of the pallet, each of said ramps comprising:
 (a) a generally upright wall at the front end thereof extending upwardly from the upper surface of its associated tine;
 (b) an inclined surface extending from said associated generally upright wall toward the rear end of its associated ramp for lifting a load advancing thereon; and
 (c) a generally horizontal surface extending from its associated inclined surface toward the rear end of its associated ramp.

20. A weighing apparatus as claimed in claim 19 wherein each of said weighing load bearing plates comprising:
 (a) a generally upright wall at the front end thereof extending upwardly from a plane passing through an upper surface of its associated tine;
 (b) an inclined surface extending from its associated generally upright wall toward said rear end of its associated weighing load bearing plate, said inclined surface of said weighing load bearing plate being greater in height than its associated generally horizontal surface of its associated ramp; and
 (c) a generally horizontal surface extending from its associated inclined surface toward the rear end of its associated weighing load bearing plate, said generally horizontal surface of said weighing load bearing plate being higher than said generally horizontal surface of its associated ramp, said pallet with the load thereon being disposed on said generally horizontal surfaces of said weighing load bearing plates during the weighing thereof.

21. A weighing apparatus for a vehicle having tines or the like comprising:
 (a) a weighing platform movable in response to a load thereon, said weighing platform having a front end and a rear end as viewed from the direction of travel of the load;
 (b) at least one load cell supported below said weighing platform and responsive to the movement of said weighing platform for emitting an electrical signal representative of the weight of the load on said weighing platform;
 (c) a shock absorber disposed below said weighing platform and above said load cell for protecting said load cell from excessive forces and for providing a medium through which said forces are transmitted to said load cell from said weighing platform, said shock absorber comprising a layer of shock absorbing material between metallic plates; and
 (d) means mechanically securing said shock absorbing material between said metallic plates.

22. A weighing apparatus as claimed in claim 21 wherein said means comprises:
 (a) a bolt having a free end extending through said shock absorbing material and said plates; and
 (b) a nut disposed in threaded engagement with the free end of said bolt and spaced from an adjacent one of said plates to define a gap therebetween enabling said shock absorber to have multi-directional movement.

23. A weighing apparatus as claimed in claim 22 and comprising a locking washer disposed within said gap.

* * * * *